Dec. 13, 1938.                A. E. BEALS                2,140,306
                  CONTROL OF GAS OR VAPOR COMPRESSORS
                     Filed June 19, 1937      2 Sheets-Sheet 1

Fig.1.

INVENTOR
*Albert E. Beals*
BY
*Dean Fairbank & Hirsch*
ATTORNEYS

Dec. 13, 1938.	A. E. BEALS	2,140,306
CONTROL OF GAS OR VAPOR COMPRESSORS
Filed June 19, 1937	2 Sheets-Sheet 2
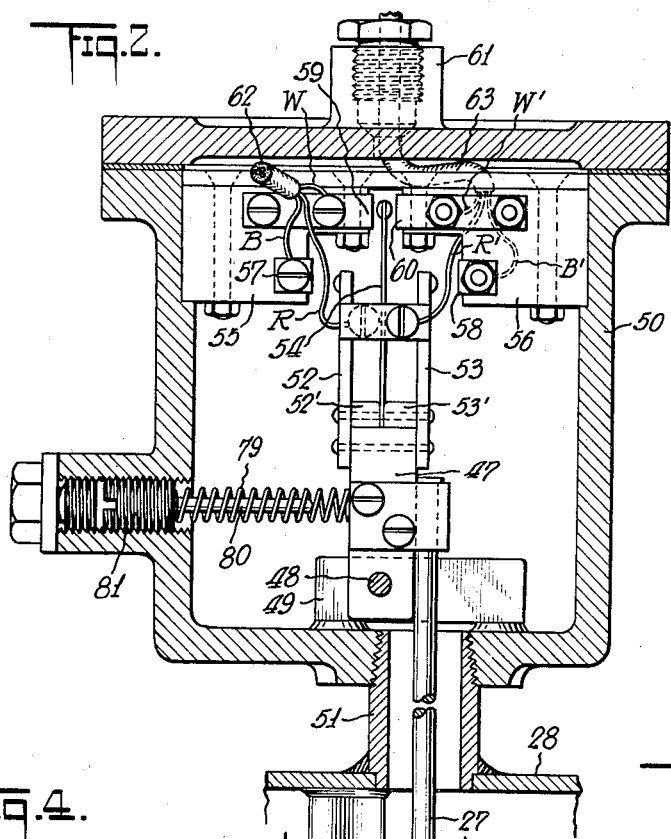
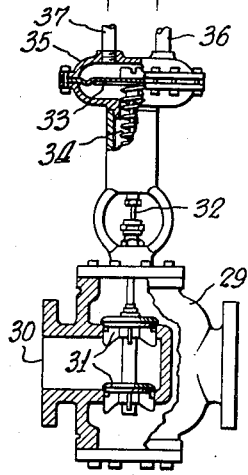
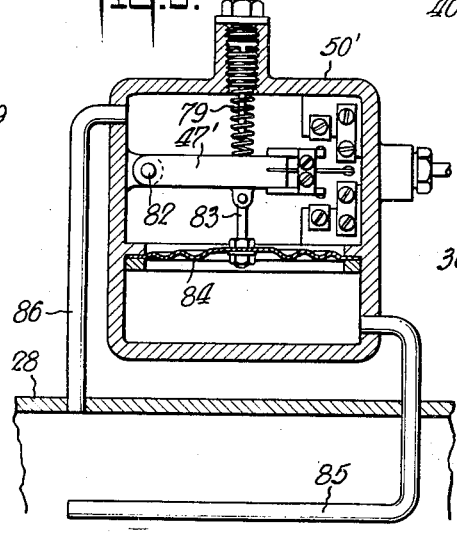
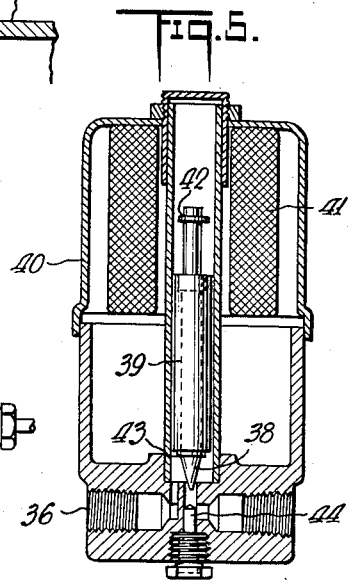
INVENTOR
*Albert E. Beals*
BY
*Dean Fairbank & Hirsch*
ATTORNEYS Patented Dec. 13, 1938

2,140,306

UNITED STATES PATENT OFFICE 2,140,306

CONTROL OF GAS OR VAPOR COMPRESSORS

Albert E. Beals, Norwich, N. Y.

Application June 19, 1937, Serial No. 149,127

18 Claims. (Cl. 62—2)

This invention relates to a method and means for governing the amount of kinetic energy remaining in a current of gas or vapor discharging, after compression, from a steam jet evacuating apparatus or thermo-compressor.

It is self evident that all kinetic energy contained in a body of gas or vapor, discharged after compression, represents lost work. There must, of necessity, be a certain amount of such energy lost due to maintaining the required flow from the thermo-compressor. This, however, should be kept at a minimum compatible with good design. It follows, therefore, that the kinetic energy in the gas discharged after compression should be kept as nearly constant as possible.

It is an object of this invention to effect a saving in the amount of motive power supplied for operating a thermo-compressor, running under varying ratios of compression, by maintaining the kinetic energy of the discharged gas at a predetermined minimum.

One use for which this type of compressor is applicable is for evacuating non-condensable gases, mixed with a certain amount of vapor, from apparatus in which it is desired to condense vapor at low temperatures.

Another use is for the purpose of maintaining low pressures within a chamber or vessel in which it is desired to cause evaporation of a liquid under conditions of low temperatures.

A special case of the latter use is for the purpose of cooling water to low temperatures by utilizing the principle of evaporating a portion of the water under conditions of low pressures and thus causing the remaining body of water to give up the heat necessary for supplying the latent heat of evaporation.

For the present purposes of illustrating and describing the type of apparatus to which the invention may be applied, a water cooling equipment will be used.

A thermodynamic characteristic of all liquids is that the boiling point, or that temperature at which evaporation takes place, is a direct function of the absolute pressure to which the liquid is subjected. For example, water boils at a temperature of 212° under a barometric pressure of 29.92" of mercury. At a barometric pressure of .1804" of mercury it will boil at 32° temperature. At a temperature of 50°, evaporation will take place if the pressure upon the liquid is reduced to .3625" of mercury.

Conversely, water vapor will be condensed into the liquid when heat is abstracted therefrom under the above conditions of temperatures and pressures.

For refrigerating purposes, as, air conditioning for instance, where the temperatures required will run between 40° and 50°, water would constitute an ideal refrigerant except for the fact that extremely large volumes of vapor must be drawn away from the boiling liquid and compressed to pressures corresponding to the temperatures of the available condensing water.

Compression of large volumes of vapor through the ratios required for refrigeration is perfectly feasible by utilizing the kinetic energy of a steam jet applied in a thermo-compressor. One serious objection to the use of this type of compression has been inefficient means for controlling the amount of steam supplied to the jet to compensate for variations in condensing temperatures and varying requirements in the temperature of the water used as the refrigerant.

In operation, if the condensing water is circulated over a cooling tower, there may be wide and, at times, sudden variations in the initial temperature of the cooling water going to the condenser. Also the same change of atmospheric conditions causing this variation in the cooling water temperatures will, in general, require a relatively wide and sudden variation in the temperature of the refrigerant water, if used for air conditioning purposes, but in the opposite direction. In other words, when the apparatus is used for air conditioning, if the atmospheric conditions cause the temperature of the cooling water to rise, the load requirements will demand that the temperature of the refrigerant water be reduced and vice versa.

The function of any type of compressor used in refrigeration is to raise a body of heat from one temperature level to a higher temperature level. Therefore, at a constant refrigerant temperature, any change in the condensing temperature results in a change in the power required by the compressor. Likewise, at a constant condensing temperature, any change in the refrigerant temperature also results in a change in the power required by the compressor. If both the refrigerant and the condensing temperatures change simultaneously, the change of power required by the compressor is cumulative.

It is obviously impossible for an attendant to manually regulate, with any degree of economy, the power supplied to a compressor when operating under constantly varying conditions as to refrigerant and condensing temperatures. This is especially true of a steam jet type of compressor.

It is another object of this invention to provide means whereby the regulation of the power supplied to a steam jet apparatus may be automatically and efficiently performed in accordance with the demands of varying refrigerant and condensing temperatures. It is also an object to provide means whereby the regulation may be accomplished with a minimum amount of lag between the demand and the supply. This is an important consideration in this particular type of apparatus.

The essential features of a steam jet vacuum apparatus consist of an evaporating vessel, a vapor condenser and a thermo-compressor, connecting the evaporating vessel and the vapor condenser. Certain auxiliary apparatus is also used in operation, but not necessary to be described here, as this type of equipment is well known commercially.

For refrigerating work a high degree of vacuum is maintained in the evaporating vessel and the refrigerant water is introduced therein in the form of spray. The latent heat required to evaporate a portion of this refrigerant water into vapor must be supplied by the main body of water which is thus cooled to the temperature corresponding to the pressure maintained in the evaporating vessel.

The thermo-compressor utilizes the kinetic energy of a jet of steam as the motive power for compression. This steam jet is expanded, through an expansion nozzle, from a relatively high pressure down to a pressure which is generally a trifle higher than the pressure within the evaporating tank. The vapor given off by the water in the evaporating tank is drawn into the thermo-compressor portion of the apparatus where its kinetic energy is increased, with a consequent reduction of kinetic energy of the jet issuing from the expansion nozzle.

The high velocity steam from the expansion nozzle and the low velocity vapor from the evaporating tank attain a common velocity, with a consequent and maximum kinetic energy. The kinetic energy of the mixture is then reduced, during its passage through the mixing tube of the compressor, with a proportionate increase in static pressure until it reaches the pressure opposing it in the condenser into which it is discharged and condensed.

Without proper regulation, the velocity, and therefore the kinetic energy, of the current discharging into the condenser may be a very variable quantity, as hereinafter explained.

The condenser may be of any commercial type and must be designed to condense the vapor from the evaporator tank and also the steam delivered to the expansion nozzle of the compressor. Its pressure, for any given refrigerating capacity and steam consumption, is a function of its design together with the amount and temperature of the cooling water available.

It is obvious that the design of the complete apparatus must be based upon the maximum temperature difference through which it will be necessary to raise the total body of heat extracted from the evaporating tank when operating at its maximum capacity. For instance, if the minimum required temperature of the cooled water should be determined to be 40° and if the maximum temperature of the condenser at the same time is found to be 105°, the equipment should be designed to raise the total extracted body of heat through this range of temperature.

The steam consumption required to perform the work, under the maximum design conditions, will be a function of the boiler pressure and the compressor design and proportions.

A characteristic of the operation of a thermo-compressor is, that the amount of vapor drawn from the evaporator tank into the compressor remains constant for any constant temperature of the cooled water, regardless of variations of pressure in the vapor condenser, provided the maximum condensing pressure for which the apparatus was designed is not exceeded.

When the condensing pressure falls below the designed maximum and the temperature of the cooled water remains constant, less power is required to compress the vapor from the evaporator pressure to the lowered condensing pressure. In such a case, assuming a constant boiler pressure, if the steam passing through the live steam expansion nozzle is allowed to remain constant, there is an excess of power supplied to the compressor.

Since the operating characteristic of the compressor precludes the possibility of drawing an additional amount of vapor from the evaporator tank, this excess of power is converted into excess kinetic energy at the end of compression. In other words, the velocity of the combined steam and vapor flowing from the compressor to the condenser is increased. This excess kinetic energy at the end of compression represents just so much lost work. This lost work is a direct function of the drop of condensing pressure below the designed maximum.

Likewise, if the condensing pressure remains constant and the pressure in the evaporating tank rises, the ratio of compression is reduced and less power is required to compress the same weight of vapor. In this case, however, a greater weight of vapor is drawn into the compressor from the evaporating tank owing to a decrease in the specific volume of the vapor.

The amount of this changed capacity is governed by the design of the compressor and is not affected by the weight of steam supplied to the expansion nozzle. Also, if the steam admitted to the nozzle is not controlled, this increase in capacity, at the higher suction pressure, is not sufficient to utilize the total power furnished by the live steam. In this case there will be an increase in capacity and an excess of kinetic energy remaining in the vapor discharging from the compressor.

It is fully established that the capacity of a thermo-compressor is constant so long as the pressure in the evaporating tank is constant, regardless of variations in the condensing pressure.

Also the capacity varies with the varying pressures in the evaporating tank. This variation, however, is determined by the design of the compressor.

It is further established that the capacity, under any condition of operating, cannot be varied by varying the amount of steam supplied to the expansion nozzle.

Therefore, it is seen that the only result of varying the amount of motive steam supplied to the expansion nozzle, under any condition of operation, is to vary the amount of kinetic energy going to waste at the end of compression.

It is the prime object of this invention to minimize this waste of kinetic energy in the operation of a thermo-compressor.

Another inherent characteristic of this type of equipment is that the weight of steam flowing through the live steam expansion nozzle is, approximately, directly proportional to the pressure at the nozzle, regardless of the terminal pressure into which it is expanded. Therefore, if the pressure of the steam delivered to the expansion nozzle is reduced by throttling, the weight of steam delivered to the compressor is reduced and the power available for compression and excess kinetic energy is reduced proportionately.

It follows that, if the pressure of the steam supplied to the expansion nozzle is reduced, the power supplied to the thermo-compressor is diminished accordingly and this, in turn, reduces the amount of excess kinetic energy going to waste at the end of compression.

For efficiency of operation, it is a principle of good design to so proportion the area of the discharge end of the ejector tube so that the velocity of the vapor, and, therefore, its kinetic energy passing this point is reduced to a minimum compatible with stable operation. This, of course, must be calculated upon the maximum design basis. In order to maintain the greatest efficiency of operation throughout the range of varying conditions, this final kinetic energy after compression should be maintained, as nearly as possible, at a constant minimum.

Therefore, it is evident that, whenever an increase of kinetic energy occurs at the discharge end of the thermo-compressor tube, the steam supply from the steam expansion nozzle should be accordingly reduced, and, conversely, a decrease in this kinetic energy should immediately be followed by an increased steam supply from the nozzle.

It is an object of this invention to regulate the amount of power supplied to the apparatus in accordance with the varying demand occasioned by changes of pressures in either the condenser or the evaporator tank. This may automatically be accomplished by means of a throttle valve in the main steam supply line which is controlled by an instrument responsive to variations in the kinetic energy of the vapor current leaving the diffuser portion of the thermo-compressor tube.

Variations in kinetic energy of a moving body of gas or vapor are indicated by varying intensities in the impact of the moving gas or vapor upon fixed objects in the path of the flow. Thus, a pendulum, suspended in the path of a moving body of gas and restrained in a position across the flow by means of a spring will exert varying tensions upon the spring in accordance with varying velocities of that flow.

Likewise, a Pitot tube, having its opening directed "upstream" against the flow, will register the sum of the static pressure plus the pressure due to the impact of the gas upon the opening. At a constant static pressure, any variations in the velocity of the flow will be registered by varying heights of the liquid in the glass to which the Pitot tube is attached.

If a U tube, sealed by a liquid, as water, has a Pitot tube, with its opening directed "upstream", attached to one leg and another pitot tube, with its opening directed in such a manner that it is not affected by the flow of the gas but only by the static pressure, is attached to the other leg, variations of velocity only will be indicated by differences in the heights of the liquid in the two legs.

Therefore, either a mechanical device, as a pendulum restrained in position across a current of flowing gas or vapor, or a pressure device, arranged to be responsive to varying impact pressures, may be used as the responsive means for governing the operation of a throttle valve. The throttle valve, in turn, regulates the pressure of steam delivered to the expansion nozzle and thus varies the power supplied to the ejector in accordance with the demands.

In the accompanying drawings I have illustrated my system and certain details of apparatus which may be employed. In these drawings:

Fig. 1 is a somewhat diagrammatic showing of a vacuum cooling system with a wiring diagram of the controlling mechanism, Fig. 2 is a central vertical section of one unit of the control system, including the member subjected to the impact force of the vapors and the electrical circuit closer operated thereby, Fig. 3 is a transverse section on the line 3—3 of Fig. 2, Fig. 4 is a side elevation, partly in section, of a steam control valve which may be employed, Fig. 5 is a vertical section of the control valve mechanism for the motive fluid applied to operate the throttle valve, and Fig. 6 is a view similar to Fig. 2, but showing a modified form.

My invention may be employed in connection with any desired vacuum system. In Fig. 1 there is shown somewhat diagrammatically a well known type of apparatus which may be employed. In the form illustrated there is an evaporator 10 to which the liquid to be evaporated is delivered through a pipe 11 and a spray pipe 12 the former being controlled by a valve 13. A substantially constant level of liquid is maintained in the evaporator by means of a float 14 operatively connected through a link 15 and lever 16 for the operation of the valve 13. The desired vacuum for effecting the operation is obtained by means of an expansion nozzle 17 mounted in an ejector 18 and delivering through a Venturi tube 19 to a condenser 20. The latter may be cooled in any suitable manner, for instance, by cooling tubes to which cooling water is delivered through a pipe 21 and from which it is withdrawn through a pipe 22. The condensate in the condenser may be withdrawn through a pipe 23 by a pump 24. The cooled liquid may be withdrawn from the evaporator through a pipe 25 by the action of a pump 26.

This apparatus is a well known type, and so far as described it embodies no novel features per se, and may be replaced by any other type of apparatus or combination of parts for accomplishing the same result. The liquid cooled in the evaporator may be employed for any desired purpose, for instance, as the cooling medium of an air conditioning system. The vacuum may also be used for concentrating a solution of a non-volatile salt or compound, or for any other desired purpose.

In my invention I control the supply of steam to the expansion nozzle 17 in accordance with the velocity and density of the vapors beyond the taper portion of the Venturi tube and on the way to the upper part of the condenser. In the specific form indicated in Fig. 1, and shown more in detail in Figs. 2 and 3, there is employed a pivoted bar, rod or blade 27 projecting into a conduit section 28 beyond the venturi and in the passage leading to the condenser. This element 27 is subjected to the impact force of the vapor and steam passing through the conduit section 28 and tends to swing toward the right in Fig. 2 as the impact increases and swing toward the left as the impact decreases. The swinging movement of this impact member 27 operates to control electric circuits which operate through relays to control or effect opening and closing of a throttle valve 29 in the steam conduit 30 leading to the expansion nozzle 17.

Any suitable type of throttle valve may be employed. That illustrated in Fig. 4 constitutes no novel portion of my invention when considered per se, and includes a balanced valve 31 connected by a valve stem 32 to a diaphragm 33. Beneath the diaphragm is a coil spring 34 normally tending to raise the diaphragm and the balanced valve to permit steam flow. The diaphragm is mounted in a casing 35, and the compartment of the casing above the diaphragm is provided with a liquid inlet conduit 36 and a liquid outlet conduit 37. By supplying liquid through the conduit 36 while the conduit 37 is closed a pressure is created in the compartment 35 to overbalance the action of the spring 34 and close the valve. By permitting escape of liquid from the pipe 37 while the supply of liquid through the pipe 36 is shut off the liquid pressure in the compartment 35 is reduced and the spring 34 opens the valve.

For controlling the flow of liquid through pipes 36 and 37 I may employ a pair of solenoid valves 40, 40' each of which may be of the type shown in Fig. 5, one disposed in the pipe 36 and the other in the pipe 37. The valve illustrated is a conventional and well known type, and the details thereof constitute no novel portion of my invention. In the form shown there is provided a reciprocating needle valve 38 with an armature 39 encircling the valve stem. In the upper portion of the casing is mounted a solenoid coil 41 which when energized lifts the armature to strike a stop 42 on the valve stem and thus lift the valve. When the circuit through the coil is broken the armature drops and strikes a stop 43 on the valve stem to close the valve. The rate of flow through the valve when the latter is open may be controlled by an adjustable pin 44 which operates to vary the size of the outlet from the valve.

In my improved system, in the form shown in Figs. 1 to 5 inclusive, an increase in the impact force and a swinging of the impact member 27 toward the right closes the electric circuit which opens the solenoid valve in the pipe 36, and permits liquid under pressure to flow into the compartment 35, depressing the diaphragm and closing or partially closing the throttle valve 31. When the impact member swings toward the left, upon a drop in impact force, another circuit is closed to energize the solenoid valve in the pipe 37 and permit escape of liquid from the compartment 35 so that the spring 34 raises the diaphragm and opens the throttle valve.

Merely as an example of a circuit controller which may be employed, I have shown in Fig. 2 the impact member 27 clamped upon an electrical insulating block 47 pivoted on a pin 48 on a bracket 49 in the lower portion of the casing 50. The casing is connected and mounted on the conduit section 28 by a short section of pipe 51 which may be welded to the conduit section 28 and threaded into the casing 50. The internal diameter of this pipe section 51 is sufficiently large to permit the desired swinging of the impact member 27. The block 47 has rigidly mounted thereon a pair of contact blades 52, 53 and between these is a flexible contact blade 54.

All three blades are electrically connected through filler pieces 52' and 53'. Mounted in the upper part of the casing 50 are two blocks 55, 56 which are of insulating material and which carry contact members 57 and 58, respectively, adapted to be engaged by the contact blades 52, 53. They also carry a pair of contact members 59, 60 either of which may be engaged by the flexible contact blade 54.

The top of the casing has a pair of stuffing boxes 61 through which extend cables 62 and 63 each including three wires. To facilitate connecting up the circuits these wires may have insulation of different colors, for instance, red, white and blue. In the cable 62 the blue wire B connects to the contact member 57, the red wire R to the contact blade 52 and the white wire W to the contact 59. In the cable 63 the blue wire B' connects to the contact member 58, the red wire R' to the contact blade 53, and the white wire W' to the contact member 60. The blades 52 and 53 are both electrically connected to the flexible blade 54 by the connections 52' and 53'.

Current is delivered through the cables from a suitable source of electric energy, preferably through a transformer. In the wiring diagram shown in Fig. 1, the line wires 64, 65 have a pair of transformer coils 66, 66' connected thereacross, and associated with the two coils 66 and 66' are coils 68 and 68' respectively.

Associated with the two transformers are relays including solenoid coils 69, 69' and double switches including blades 70, 70', 71, 71'. It will be understood that each relay may be mounted in the same casing with its transformer so as to form a unit.

The elements of the system for closing the throttle valve are connected up to the wires of the cable 62 as follows:

The wire W leads to one terminal of the coil 68, and the other terminal of the coil is connected by a wire 72 to one terminal of the solenoid coil 69. The other terminal of the solenoid coil 69 is connected to the wire B. The blade 71 is connected to the wire B by a wire 73, and the contact element of the blade 71 is connected to the wire R. A wire 74 leads from the line wire 65 to one terminal of the coil 41 of the valve in the pipe 36, and the other wire 75 of the same coil 41 is connected to the switch blade 70. The contact member of this blade is connected by a wire 76 to the other line wire 64. The same kind of wiring system connects the transformers 66', 68', the cable 63, the other relay and the valve 40' in the outlet pipe 37, similar reference characters being used in these circuits, but with the prime mark.

The apparatus operates as follows:

When the impact force of the vapor exceeds a predetermined limit it swings the impact member 27 toward the right and swings the contact blades toward the left. The first portion of such movement brings the blade 54 into engagement with the contact member 59 so as to connect the wires R and W. This does not result in the closing of the circuit because the wire R leads to the contact member of the open switch 71. When the impact force exceeds a second predetermined limit the contact blade 52 comes into engagement with the contact 57, and thus closes the circuit from the wire W through the wire B. The closing of the circuit through the wire B permits current to flow from the coil 68 through the wire 72, coil 69, wire B and wire W back to the transformer coil. The energizing of the coil 69 closes both of the switches 70 and 71, and the current may then flow from the wire 72 through the coil 69, wire 73, switch 71, wire R and wire W back to the transformer. It also permits current to flow from the line wire 65 through the wire 74, coil 41, wire 75, switch 70 and wire 76 to the line wire 64. This opens the solenoid valve in the inlet pipe 36 permitting a fluid pressure to build up in the chamber 35 and partially closing the throttle valve so as to reduce the kinetic energy produced by the steam jet. The rate of closing of the throttle valve is comparatively slow due to the resistance to the flow of the liquid by the action of the throttle pin 46.

As the impact force decreases, the impact member 27 tends to swing toward the left and the first action is to break the connection between the blade 52 and contact member 57, thus preventing flow of current through the wire B. This does not immediately deenergize the relay coil 69 because the current may continue to flow through the wire 72, coil 69, wire 73, switch 71, wire R, contacts 54 and 59 and wire W. When the impact member 27 approaches the normal or intermediate position the blade 54 moves out of engagement with the contact 59 to break the circuit through the wire W, and the relay coil 69 is deenergized and the switches 70 and 71 are opened. The solenoid valve of the inlet pipe 36 thus closes, and the pressure in the chamber 35 will remain constant to hold the throttle valve 31 open to such an extent as will give the desired rate of steam flow from the jet 17 and the desired kinetic energy of the conduit section 28.

If the impact force drops below the desired minimum the blade 54 will engage the contact 60, and if there is a further drop the blade 53 will engage the contact 58, energizing the relay 69' and opening the valve of the discharge pipe 37 from the diaphragm chamber of the throttle valve. As the operation of the two solenoid valves is substantially the same and they are connected up in the same way to their respective relays and transformers, it is thought that further description of this portion of the operation when the impact force decreases is unnecessary.

It will be noted that the circuit controller operated by the impact member 27 makes the circuits through the engagement of the blades 52 and 53 with the contacts 57 and 58, but the circuits are not broken when these blades move out of engagement with their respective contacts. The circuit is broken only when the blade 54 moves out of engagement with the contacts 59 or 60.

As previously noted, I do not wish to be limited to this particular type of circuit controller, or to this particular wiring system, as a wide variety of other mechanisms may be employed for opening and closing the throttle valve of the steam jet 17 in accordance with the impact force of the vapor and steam in the conduit section 28.

During the operation of a steam jet ejector compressor there is usually carried along with the current of vapor a certain amount of entrained moisture. This moisture may originate in the wet steam coming from the expansion nozzle, or it may have become entrained in the vapor from the evaporator tank. It varies in amount from time to time and, if allowed to impinge upon the impact member of the control instrument, will intensify the force of impact thereon. Therefore the action of this moisture will have the effect of conveying a false impulse to the impact member of the instrument.

As shown in Figs. 1, 2 and 3 a deflector or protecting element 78 is mounted in advance of the impact member 27. This may be a rigid blade which is preferably streamlined, that is, it is comparatively blunt at the side away from the impact member 27 and tapers to an edge nearest the impact member, as shown particularly in Fig. 3, so that drops of liquid striking the blunt side of the baffle will be deflected laterally, whereas vapors and gases may flow along the surface of the baffle and will strike the impact member 27 with substantially the same effect as though the deflector member were omitted.

The impact member may be normally held against the action of the vapors in any suitable manner. As shown the casing 50 has a coil spring 79 encircling a guide rod 80 and engaging the block 47 above the pivot 48. The tension of the spring may be varied by adjusting a threaded stop 81 and may be such as to hold the impact member in neutral position against the action of the vapors when the kinetic energy is within the desired limits. These limits may be readily varied by changing the tension on the spring 79.

Merely as indicating another way in which the desired result may be accomplished, I have shown somewhat diagrammatically in Fig. 6 a construction in which the impact member 27 is omitted. In this form the circuit closer mounted in a casing 50' is similar in most respects to that in the casing member 50, and all of the contacts within the casing may be the same as shown in Fig. 2. The block 47' is mounted on a pivot 82 at one side of the casing and is connected by a link 83 to a diaphragm 84. The chamber at one side of the diaphragm is connected by a Pitot tube 85 extending into the conduit 28 and having an open end facing "upstream", in other words, in the direction from which the steam and vapors are being delivered. The chamber at the opposite side of the diaphragm 84 is connected by a pipe 86 to the side of the conduit section 28 at a point opposite the end of the tube 85. Thus the static pressure in the conduit 28 may be transmitted through the pipes 85 and 86 and will act equally upon opposite sides of the diaphragm. The kinetic energy or impact force will act only through the pipe 85 and an increase in this energy or force will increase the pressure below the diaphragm 84 and lift the latter against the action of the spring 79 to close the circuit and open the valve in the liquid inlet pipe 36 leading to the diaphragm chamber of the throttle valve and close the latter. Similarly a reduction in the energy or force will permit the diaphragm to be pushed down and close the other circuit to cause the other solenoid valve to open and permit liquid to escape from the chamber 35 and the throttle valve to open.

A wide variety of other mechanisms may be employed for accomplishing the desired result and embodying the invention defined in the appended claims.

Having thus described my invention, what I claim as new and desire to secure by Letters Patent is:

1. The method of effecting and controlling the operation in an evaporating chamber which includes withdrawing vapor from said chamber by the action of the steam jet of a thermo-compressor discharging to a condenser, and varying the flow of steam to said steam jet in accordance with variations in the kinetic energy of the current of vapor and gas discharging from said thermo-compressor.

2. The method of controlling the operation of a thermo-compressor which has a steam jet acting to withdraw vapor from an evaporating chamber and to deliver the steam and vapor to a condenser, said method including regulating the initial pressure of motive steam supplied to the nozzle of said steam jet in accordance with the variation in the velocity of the current of discharged vapor and gas between said nozzle and said condenser.

3. The method of controlling the evaporating action in an evaporator in accordance with varying conditions in a condenser, which includes withdrawing vapors from said evaporator and delivering them to said condenser by the action of a steam jet and varying the amount of motive steam flowing through said jet in accordance with the kinetic energy of the steam and vapor at a point between the nozzle and the condenser.

4. The method which includes withdrawing vapor from an evaporating chamber and delivering it to a condenser by the action of a steam jet and maintaining a constant velocity head in the current of vapor discharged from said thermo-compressor by varying the amount of motive fluid flowing through the expansion nozzle of said steam jet.

5. The method which includes withdrawing vapor from an evaporating chamber and delivering it to a condenser by the action of a steam jet and controlling the flow of steam to said jet to maintain substantially constant the velocity of the current of discharging vapor and gas, and independent of variations in operating conditions in the evaporator and condenser.

6. The method of controlling the operation of an apparatus including an evaporating chamber, a thermo-compressor having a steam jet nozzle for withdrawing vapor from said chamber, and a condenser for receiving the steam from said jet and vapor from said chamber, said method including varying the amount of motive steam flowing through said jet in accordance with the kinetic energy of the steam and vapor at a point between the nozzle and the condenser.

7. An apparatus for controlling the operation of a thermo-compressor including a steam jet nozzle operating to transfer vapor from an evaporator to a condenser, and in accordance with the conditions in said evaporator and condenser, including a control instrument responsive to variations in the velocity head of the current of vapor and gas discharged by said thermo-compressor, and means controlled thereby for varying the delivery of steam to said nozzle.

8. In a vapor jet refrigerating apparatus the combination of a thermo-compressor having a valve controlled steam jet nozzle, an evaporator connected to the inlet of said thermo-compressor, a condenser connected to the outlet of said thermo-compressor, a control member disposed at the discharging end of the thermo-compressor and movable toward and from said nozzle in accordance with variations in the velocity head of the vapor and gas passing said member, and means controlled by said member for varying the weight of vapor passing the controlling member per unit of time.

9. In a vapor jet refrigerating apparatus including an evaporating chamber, a condenser and a thermo-compressor for withdrawing vapor from said evaporator and delivering the same to said condenser, said thermo-compressor including a steam jet nozzle and a control valve therefor, the combination therewith of means operating in accordance with the variations in the kinetic energy of the fluid delivered by said thermo-compressor for controlling said valve.

10. The combination with a thermo-compressor, an evaporating chamber and a condenser, said thermo-compressor having a nozzle for the delivery of steam under pressure, of a control instrument at the discharge end of said thermo-compressor and operating under variations in the velocity head of the fluid passing said instrument, and means controlled by said instrument for regulating the supply of steam to the nozzle of said thermo-compressor.

11. In combination with a thermo-compressor for removing vapor and gas from an evaporating chamber and delivering them to a condenser, a control instrument responsive to variations in the velocity head of the current of vapor and gas discharged by said thermo-compressor, and means controlled thereby for varying the delivery of steam to the expansion nozzle of said thermo-compressor.

12. An apparatus for regulating the amount of power supplied to a thermo-compressor operatively connecting an evaporating vessel and a condenser, and in accordance with varying demands occasioned by changes in the pressure in either the condenser or the evaporator, said apparatus including a member movable to varying degrees in accordance with variations in the velocity of the fluid discharged by the thermo-compressor, and means operated thereby for controlling the amount of steam delivered to the nozzle of said thermo-compressor.

13. A steam jet evacuation apparatus for effecting evaporation in one chamber and condensation in another, and including an expansion nozzle, an impact member positioned across the current of the discharging gas or vapor and having a restricted motion with and against said current, adjustable yielding means for opposing the impact force of the gas current upon said impact member whereby the extent of movement due to a predetermined impact may be controlled, and means for varying the amount of motive steam supplied to the expansion nozzle in accordance with variations from said predetermined intensity of the force acting upon the impact member.

14. In a vapor jet refrigerating apparatus the combination of a thermo-compressor having a valve controlled steam jet nozzle, an evaporator connected to the inlet of said thermo-compressor, a condenser connected to the outlet of said thermo-compressor, an instrument responsive to impact variations of the discharging gas or vapor, and means for increasing the amount of motive steam supplied to said nozzle upon a decrease in the intensity of said impact force and decreasing the amount of motive steam supplied to the nozzle upon an increase in the intensity of said impact force.

15. In a vapor jet refrigerating apparatus the combination of a thermo-compressor having a valve controlled steam jet nozzle, an evaporator connected to the inlet of said thermo-compressor, a condenser connected to the outlet of said thermo-compressor, a suspended impact member extending transversely of the discharging current of the thermo-compressor and having a restricted motion with and against the flow of said current, electric contact members contiguous to and movable with said contact member, stationary electric contact members adapted to be engaged by said movable contact members, a spring opposing the impact force of the current upon said member, and means controlled by said contact members for determining the position of said valve.

16. In a vapor jet refrigerating apparatus the combination of a thermo-compressor having a valve controlled steam jet nozzle, an evaporator connected to the inlet of said thermo-compressor, a condenser connected to the outlet of said thermo-compressor, a control instrument responsive to variations in the velocity head of the current of vapor and gas discharging from said thermo-compressor, and means for varying the weight of vapor passing said control instrument per unit of time to maintain a constant velocity head in the current of said discharging vapor and gas.

17. In a vapor jet refrigerating apparatus the combination of a thermo-compressor having a valve controlled steam jet nozzle, an evaporator connected to the inlet of said thermo-compressor, a condenser connected to the outlet of said thermo-compressor, a control instrument responsive to variations in the velocity head of the current of vapor and gas delivered by said thermo-compressor, and means for controlling the position of said valve in accordance with the position of said control instrument.

18. In a vapor jet refrigerating apparatus the combination of a thermo-compressor having a valve controlled steam jet nozzle, an evaporator connected to the inlet of said thermo-compressor, a condenser connected to the outlet of said thermo-compressor, a member mounted in said thermo-compressor and movable lengthwise thereof and to positions varying with the kinetic energy of the fluid passing said member, and means for controlling the position of the valve of said nozzle in accordance with the position of said member.

ALBERT E. BEALS.